(12) United States Patent
Rosario

(10) Patent No.: US 10,753,760 B2
(45) Date of Patent: Aug. 25, 2020

(54) NAVIGATION SYSTEMS AND ASSOCIATED METHODS

(71) Applicant: INTEL CORPORATION, Santa Clara, CA (US)

(72) Inventor: Barbara Rosario, Berkely, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/596,722

(22) Filed: May 16, 2017

(65) Prior Publication Data

US 2018/0094945 A1   Apr. 5, 2018

Related U.S. Application Data

(63) Continuation of application No. 14/692,610, filed on Apr. 21, 2015, now Pat. No. 9,651,395, which is a
(Continued)

(51) Int. Cl.
*G01C 21/00* (2006.01)
*G01C 21/36* (2006.01)
(Continued)

(52) U.S. Cl.
CPC .......... *G01C 21/3644* (2013.01); *A63F 9/183* (2013.01); *G01C 21/36* (2013.01); *G01C 21/3602* (2013.01); *G01C 21/3641* (2013.01); *G06Q 10/101* (2013.01); *G06Q 50/01* (2013.01); *G08G 1/0962* (2013.01); *G08G 1/0969* (2013.01); *G08G 1/096716* (2013.01); *G08G 1/096741* (2013.01); *G08G 1/096775* (2013.01); *G08G 1/096791* (2013.01); *G08G 1/096827* (2013.01); *G08G 1/096838* (2013.01); *G08G 1/096844* (2013.01); *G08G 1/096872* (2013.01);
(Continued)

(58) Field of Classification Search
None
See application file for complete search history.

(56) References Cited

U.S. PATENT DOCUMENTS 5,925,090 A    7/1999   Poonsaengsathit
6,453,056 B2   9/2002   Laumeyer et al.
(Continued)

FOREIGN PATENT DOCUMENTS

WO    2013-101045 A1    7/2013

OTHER PUBLICATIONS

Notice of Allowance issued in U.S. Appl. No. 15/858,011, dated May 14, 2018, 25 pages.
(Continued)

*Primary Examiner* — Jonathan M Dager
(74) *Attorney, Agent, or Firm* — Grossman, Tucker, Perreault & Pfleger, PLLC

(57) ABSTRACT

Navigation systems and associated methods for providing navigation services are provided. Information associated with a desired route for a vehicle, such as a route between a current location and a desired destination, may be determined. Additionally, contextual information associated with the vehicle may be identified. Based upon the desired route and the contextual information, a direction may be generated for presentation to one or more users, and the generated direction may be output for presentation.

31 Claims, 6 Drawing Sheets

Related U.S. Application Data continuation of application No. 13/977,559, filed as application No. PCT/US2011/067817 on Dec. 29, 2011, now Pat. No. 9,043,133.

(51) Int. Cl.

| | |
|---|---|
| *G08G 1/0969* | (2006.01) |
| *G08G 1/0962* | (2006.01) |
| *G08G 1/0967* | (2006.01) |
| *G08G 1/0968* | (2006.01) |
| *A63F 9/18* | (2006.01) |
| *G06Q 10/10* | (2012.01) |
| *G06Q 50/00* | (2012.01) |
| *G09B 29/00* | (2006.01) |
| *A63F 9/24* | (2006.01) |

(52) U.S. Cl.
CPC ............ *A63F 2009/2476* (2013.01); *A63F 2300/8017* (2013.01); *G09B 29/00* (2013.01)

(56) References Cited

U.S. PATENT DOCUMENTS

| | | | |
|---|---|---|---|
| 6,937,747 B2 | 8/2005 | Culp et al. | |
| 7,898,437 B2 | 3/2011 | Okada et al. | |
| 8,090,530 B2 | 1/2012 | Horvitz | |
| 8,121,350 B2 | 2/2012 | Klefenz | |
| 8,229,169 B2 | 7/2012 | Nakamura et al. | |
| 8,346,706 B2 | 1/2013 | Groitzsch et al. | |
| 8,374,791 B2 | 2/2013 | Holsinger | |
| 8,379,923 B2 | 2/2013 | Ishikawa | |
| 8,380,810 B2 | 2/2013 | Sathish et al. | |
| 8,417,449 B1 | 4/2013 | Denise | |
| 8,473,197 B2* | 6/2013 | Horvitz | G01C 21/3492 701/423 |
| 8,483,951 B2 | 7/2013 | Shih et al. | |
| 8,527,143 B2* | 9/2013 | Tan | G01C 21/3664 340/686.6 |
| 8,548,734 B2* | 10/2013 | Barbeau | G01C 21/3617 701/410 |
| 8,606,335 B2* | 12/2013 | Ozaki | H04M 1/56 455/569.2 |
| 8,606,516 B2 | 12/2013 | Vertelney et al. | |
| 8,718,925 B2 | 5/2014 | Letchner et al. | |
| 8,761,435 B2 | 6/2014 | Chen | |
| 8,890,674 B2 | 11/2014 | Zeiger et al. | |
| 8,918,277 B2 | 12/2014 | Niem et al. | |
| 9,189,959 B2 | 11/2015 | Bank et al. | |
| 9,494,441 B2 | 11/2016 | Chou | |
| 9,713,963 B2* | 7/2017 | Liu | B60L 58/13 |
| 2001/0051850 A1 | 12/2001 | Wietzke et al. | |
| 2002/0082771 A1* | 6/2002 | Anderson | G01C 21/3484 701/423 |
| 2004/0100460 A1* | 5/2004 | Yamada | G01C 21/36 345/204 |
| 2004/0215377 A1 | 10/2004 | Yun | |
| 2004/0260457 A1* | 12/2004 | Kawase | G01C 21/14 701/410 |
| 2005/0075119 A1* | 4/2005 | Sheha | G01C 21/3626 455/456.6 |
| 2005/0225636 A1 | 10/2005 | Maemura et al. | |
| 2006/0100774 A1 | 5/2006 | Barkowski et al. | |
| 2006/0149461 A1* | 7/2006 | Rowley | G08G 1/096811 701/423 |
| 2006/0238409 A1* | 10/2006 | Yoshioka | G01C 21/3623 342/126 |
| 2006/0247852 A1 | 11/2006 | Kortge et al. | |
| 2007/0016362 A1* | 1/2007 | Nelson | G01C 21/362 701/425 |
| 2007/0150174 A1* | 6/2007 | Seymour | G01C 21/3617 701/532 |
| 2007/0294030 A1* | 12/2007 | Jones | G01C 21/26 701/519 |
| 2008/0056535 A1 | 3/2008 | Bergmann et al. | |
| 2008/0077322 A1 | 3/2008 | Sumizawa | |
| 2008/0248815 A1* | 10/2008 | Busch | G06Q 20/3224 455/456.5 |
| 2009/0005964 A1* | 1/2009 | Forstall | G01C 21/3484 701/533 |
| 2009/0005980 A1 | 1/2009 | Nakao et al. | |
| 2009/0011799 A1* | 1/2009 | Douthitt | H04M 1/6091 455/569.1 |
| 2009/0074249 A1 | 3/2009 | Moed et al. | |
| 2009/0118994 A1 | 5/2009 | Mori et al. | |
| 2009/0150156 A1* | 6/2009 | Kennewick | G06Q 30/0261 704/257 |
| 2009/0172527 A1 | 7/2009 | Buecker et al. | |
| 2009/0177378 A1 | 7/2009 | Kamalski et al. | |
| 2009/0177386 A1 | 7/2009 | Haase | |
| 2009/0177396 A1 | 7/2009 | Thomassen | |
| 2009/0177677 A1 | 7/2009 | Mikusiak | |
| 2009/0228204 A1 | 9/2009 | Zavoli et al. | |
| 2009/0237269 A1 | 9/2009 | Okugi et al. | |
| 2009/0248284 A1 | 10/2009 | Yoshioka et al. | |
| 2009/0312946 A1* | 12/2009 | Yoshioka | G01C 21/26 701/532 |
| 2009/0319176 A1* | 12/2009 | Kudoh | G01C 21/3617 701/408 |
| 2010/0036599 A1 | 2/2010 | Froeberg et al. | |
| 2010/0069054 A1* | 3/2010 | Labidi | G01C 21/20 455/418 |
| 2010/0131443 A1* | 5/2010 | Agarwal | H04L 67/32 706/46 |
| 2010/0179756 A1 | 7/2010 | Higgins et al. | |
| 2010/0188864 A1 | 7/2010 | Raghunathan et al. | |
| 2010/0292886 A1 | 11/2010 | Szczerba et al. | |
| 2010/0323715 A1* | 12/2010 | Winters | G01S 5/0027 455/456.1 |
| 2010/0332119 A1 | 12/2010 | Geelen et al. | |
| 2011/0130956 A1 | 6/2011 | Tracton et al. | |
| 2011/0161001 A1* | 6/2011 | Fink | G01C 21/3617 701/533 |
| 2011/0184639 A1 | 7/2011 | Holsinger | |
| 2011/0238289 A1* | 9/2011 | Lehmann | G01C 21/3438 701/533 |
| 2011/0257883 A1 | 10/2011 | Kuznetsov | |
| 2011/0288762 A1* | 11/2011 | Kuznetsov | G01C 21/32 701/532 |
| 2012/0041675 A1 | 2/2012 | Juliver et al. | |
| 2012/0054028 A1 | 3/2012 | Tengler et al. | |
| 2012/0075118 A1* | 3/2012 | Basir | G06Q 20/06 340/905 |
| 2012/0089321 A1 | 4/2012 | Jung | |
| 2012/0221242 A1* | 8/2012 | Schulte | G01C 21/3617 701/468 |
| 2013/0218453 A1 | 8/2013 | Geelen | |
| 2014/0097748 A1 | 4/2014 | Kato | |
| 2014/0107921 A1* | 4/2014 | Delling | G01C 21/3446 701/533 |
| 2014/0142948 A1 | 5/2014 | Rathi et al. | |
| 2015/0285652 A1* | 10/2015 | Peri | G01C 21/3476 701/438 |
| 2018/0128632 A1* | 5/2018 | Raffa | G01C 21/3461 |

OTHER PUBLICATIONS

Notice of Allowance issued in U.S. Appl. No. 15/858,249, dated May 15, 2018, 25 pages.
Office Action issued in U.S. Appl. No. 15/858,109, dated Apr. 4, 2018, 6 pages.
Office Action issued in U.S. Appl. No. 14/692,610, dated Feb. 11, 2016, 9 pages.
Office Action issued in U.S. Appl. No. 14/692,610, dated Sep. 6, 2016, 8 pages.
Final Office Action issued in U.S. Appl. No. 14/692,610, dated May 24, 2016, 9 pages.
Notice of Allowance issued in U.S. Appl. No. 14/692,610, dated Jan. 20, 2017, 7 pages.
International Search Report issued in PCT Application No. PCT/US2011/067817, dated Jun. 29, 2012, 10 pages.

(56) References Cited

OTHER PUBLICATIONS

International Preliminary Report on Patentability issued in PCT Application No. PCT/US2011/067817, dated Jul. 10, 2014, 7 pages.
"Cadillac Challenges Tesla with the Super Cruise Self-Driving System—WIRED", Oct. 5, 2017, 7 pages.
"Cadillac Super Cruise first Drive", Business Insider, Oct. 6, 2017, 7 pages.
"Cadillac Super Cruise Sets the Standard fr Hands-Free Highway Driving", Select Country, Oct. 5, 2017, 5 pages.
Burns, Matt: "Cadillac Super Cruise 'Autopilot' is ready for the expressway", TechCrunch, Aug. 3, 2017, 7 pages.
"General Motors Automatic Park Assist Info", GM Authority, Oct. 6, 2017, 2 pages.
"How Google Driverless Car Predicting Movement of Vehicles on Road?", Jan. 6, 2015, 4 pages.
"Google Driverless Car—The Obstacle Detection Unit", Jun. 14, 2014, 6 pages.
"What are the technologies lying under the hood of Google driverless car?", Jun. 6, 2014, 3 pages.
"Google Self Driving Car's feature of limited location will prevent its misuse", May 27, 2014, 4 pages.
"Volkswagen Democratizes High-End Driver Assistance Features for the 2016 Model Year", Volkswagen of America, Oct. 5, 2017, 5 pages.
"Super Cruise—Hands-Free Driving System | Cadillac", Oct. 5, 2017, 8 pages.
Notice of Allowance issued in U.S. Appl. No. 15/858,109, dated Oct. 18, 2018, 32 pages.
Notice of Allowance issued in U.S. Appl. No. 15/858,249, dated Oct. 25, 2018, 16 pages.
Notice of Allowance issued in U.S. Appl. No. 15/858,011, dated Oct. 30, 2018, 16 pages.
Notice of Allowance issued in U.S. Appl. No. 15/858,011, dated Jul. 19, 2018, 16 pages.
Notice of Allowance issued in U.S. Appl. No. 15/858,249, dated Jul. 10, 2018, 16 pages.

\* cited by examiner

NAVIGATION SYSTEMS AND ASSOCIATED METHODS

CROSS-REFERENCE TO RELATED APPLICATIONS

This application is a continuation of U.S. patent application Ser. No. 14/692,610, filed Apr. 21, 2015, which is a continuation of U.S. patent application Ser. No. 13/977,559, filed Apr. 29, 2014, now U.S. Pat. No. 9,043,133, issued May 26, 2015, which is a national stage entry of International Patent Application No. PCT/US2011/067817, filed Dec. 29, 2011, the entire contents of which are incorporated by reference herein.

TECHNICAL FIELD

Aspects of the disclosure relate generally to vehicle navigation systems, and more particularly, to navigation systems that generate descriptive outputs utilizing contextual information associated with a vehicle.

BACKGROUND

The use of vehicle navigation systems is now ubiquitous. Navigation systems typically track the location of a vehicle and display the location along with map data in a human-readable format. Additionally, navigation systems typically output visual and audio directions associated with a mapped route. However, the directions output by conventional navigation systems are typically based on distances and street names. For example, a driver may be instructed to "turn right onto Main Street in 100 feet." In certain instances, a user may have difficulty in maintaining a desired course based upon these conventional instructions. For example, a street name may not be clearly marked, thereby increasing a likelihood that a user turns onto the wrong street. Accordingly, there is an opportunity for improved systems and methods for generating descriptive outputs associated with navigation directions.

BRIEF DESCRIPTION OF THE FIGURES

Reference will now be made to the accompanying drawings, which are not necessarily drawn to scale, and wherein.

DETAILED DESCRIPTION

Embodiments of the disclosure may provide systems, methods, and apparatus for generating and outputting a wide variety of descriptive outputs within a vehicle environment. In certain embodiments, contextual information associated with a vehicle may be obtained by a suitable navigation system and/or navigation application. For example, image data associated with an external or exterior environment of the vehicle may be collected from one or more image sensors (e.g., cameras), and the image data may be evaluated in order to identify contextual information associated with the vehicle. Other contextual information that may be collected in certain embodiments includes, for example, traffic information, crime information, accident report information, etc. Based at least in part upon the obtained contextual information and information associated with a desired route of the vehicle, one or more directions may be generated and output. As desired, these directions may include descriptive information associated with a vehicle's environment. For example, a direction to "turn right directly after the yellow truck parked on your right" may be generated and output. As another example, a direction to "keep to the left, following the red car in front of you" may be generated and output. As yet another example, obtained traffic data may be evaluated to determine that a mapped route will encounter relatively heavy traffic, and the message "The traffic ahead is heavy. Would you like to hear an alternative route?" may be output. A user response may then be received and processed.

Certain embodiments will now be described more fully hereinafter with reference to the accompanying drawings, in which various embodiments and/or aspects are shown. However, various aspects may be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

Figure 1:
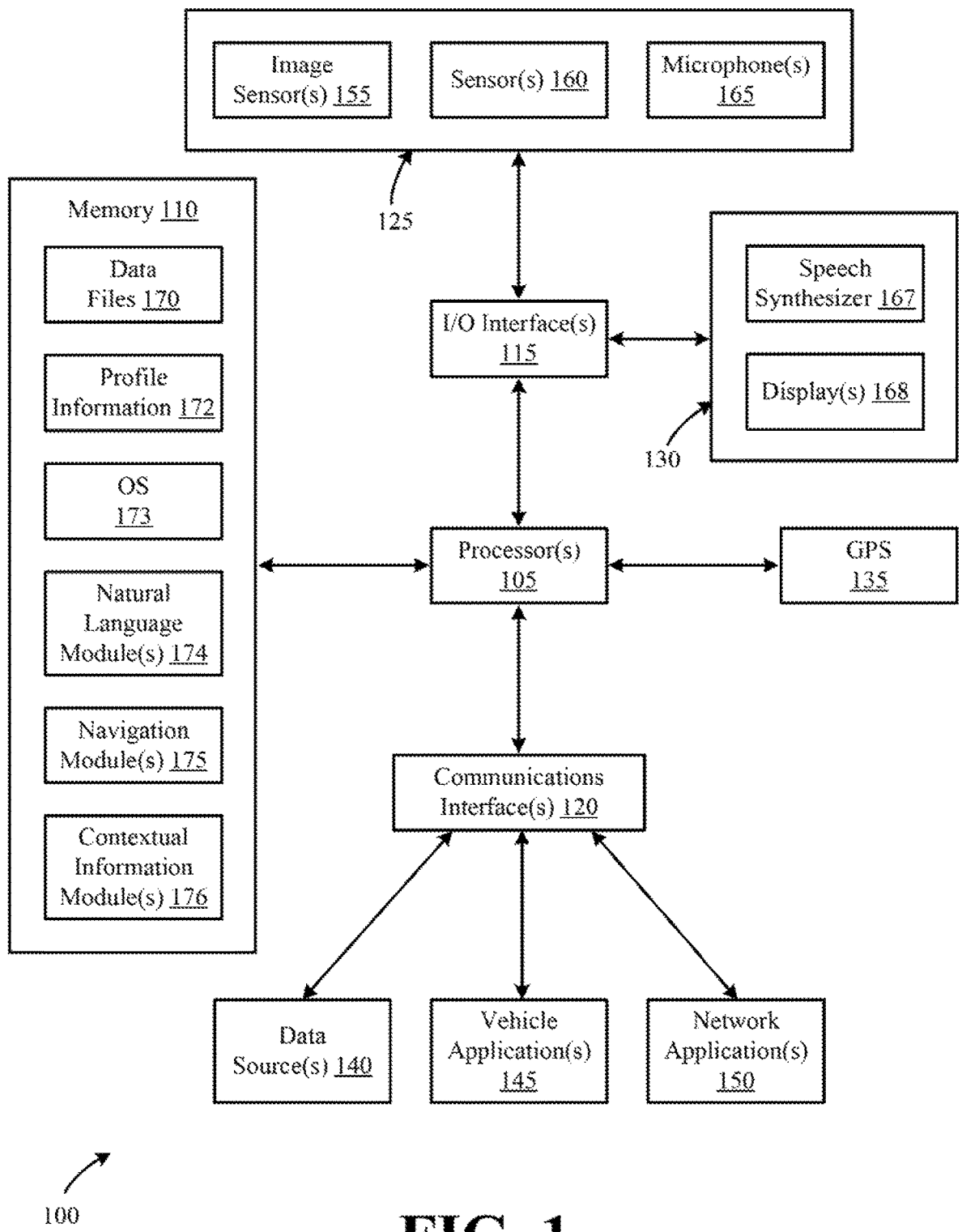
FIG. 1 is a block diagram of an example navigation system or architecture that may be utilized in accordance with various embodiments of the disclosure.

FIG. 1 illustrates a block diagram of an example system 100, architecture, or component that may be utilized to generate natural language outputs. In certain embodiments, the system 100 may be implemented or embodied as a navigation system. In other embodiments, the system 100 may be implemented or embodied as a component of another system or device within a vehicle, such as an in-vehicle infotainment ("IVI") system associated with a vehicle. In yet other embodiments, one or more suitable computer-readable media may be provided for generating natural language outputs. These computer-readable media may include computer-executable instructions that are executed by one or more processing devices in order to process speech input. As used herein, the term "computer-readable medium" describes any form of suitable memory or memory device for retaining information in any form, including various kinds of storage devices (e.g., magnetic, optical, static, etc.). Indeed, various embodiments of the disclosure may be implemented in a wide variety of suitable forms.

As desired, the system 100 may include any number of suitable computing devices associated with suitable hardware and/or software for processing speech input. These computing devices may also include any number of processors for processing data and executing computer-executable instructions, as well as other internal and peripheral components that are well-known in the art. Further, these computing devices may include or be in communication with any number of suitable memory devices operable to store data and/or computer-executable instructions. By executing computer-executable instructions, a special-purpose computer or particular machine for generating natural language outputs, such as natural language directions, may be formed.

With reference to FIG. 1, the system may include one or more processors 105, memory devices 110 (generally referred to as memory 110), input/output ("I/O") interfaces 115, and/or communications interfaces 120 (e.g., network interfaces, data bus interfaces, etc.). Additionally, the system may include any number of other components in communication with the processors 105, such as input devices 125, output devices 130, a suitable global positioning system ("GPS") 135 or other location determination system, and/or any number of components and/or devices configured to execute applications that communicate information to the processors 105. A wide variety of various applications and/or devices may be in communication with the processors 105 via the communications interfaces 120 and, as desired, any number of suitable networks. For example, one or more data sources 140 (e.g., vehicle data sources, external data sources, etc.), vehicle applications 145, and/or network or run time applications 150 may be in communication with the processors 105.

The processors 105 may include any number of suitable processing devices, such as a central processing unit ("CPU"), a digital signal processor ("DSP"), a reduced instruction set computer ("RISC"), a complex instruction set computer ("CISC"), a microprocessor, a microcontroller, a field programmable gate array ("FPGA"), or any combination thereof. As desired, a chipset (not shown) may be provided for controlling communications between the processors 105 and one or more of the other components of the system 100. In one embodiment, the system 100 may be based on an Intel® Architecture system, and the processor 105 and chipset may be from a family of Intel® processors and chipsets, such as the Intel® Atom® processor family. The processors 105 may also include one or more processors as part of one or more application specific-integrated circuits ("ASICs") or application-specific standard products ("ASSPs") for handling specific data processing functions or tasks.

The memory 110 may include any number of suitable memory devices, such as caches, read-only memory devices, random access memory ("RAM"), dynamic RAM ("DRAM"), static RAM ("SRAM"), synchronous dynamic RAM ("SDRAM"), double data rate ("DDR") SDRAM ("DDR-SDRAM"), RAM-BUS DRAM ("RDRAM"), flash memory devices, electrically erasable programmable read only memory ("EEPROM"), non-volatile RAM ("NVRAM"), universal serial bus ("USB") removable memory, magnetic storage devices, removable storage devices (e.g., memory cards, etc.), and/or non-removable storage devices. As desired, the memory 110 may include internal memory devices and/or external memory devices in communication with the system 100. The memory 110 may store data, executable instructions, and/or various program modules utilized by the processors 105. Examples of data that may be stored by the memory 110 include data files 170, user profile information 172, and/or any number of suitable program modules and/or applications that may be executed by the processors 105, such as an operating system ("OS") 173, one or more natural language modules 174, one or more navigation modules 175, and/or one or more contextual information modules 176.

The I/O interfaces 115 may facilitate communication between the processors 105 and any number of suitable input and/or output devices. Examples of suitable input devices 125 include, but are not limited to, one or more image sensors 155 (e.g., a camera, etc.), any number of other sensors 160 (e.g., infrared sensors, light sensors, range finders, etc.), one or more microphones 165 and/or other suitable audio capture devices, and/or any number of suitable input elements (e.g., buttons, knobs, touch screen displays, etc.). Examples of suitable output devices include, but are not limited to, one or more speech synthesizers 167 and/or associated speakers and/or one or more suitable displays 168. The various input and output devices 125, 130 may include any number of suitable devices that facilitate the collection of information to be provided to the processors 105 and/or the output of information for presentation to a user. The communications interfaces 120 may facilitate communication between the processors 105 and/or any number of suitable data buses and/or networks, such as a car area network bus ("CANBUS"), other vehicle data bus, and/or any number of wireless networks (e.g., a Bluetooth-enabled network, a Wi-Fi enabled network, a cellular network, etc.).

The data files 170 may include any suitable data that facilitates the operation of the system 100 and/or communication between various components of the system 100. For example, the stored data files 170 may include, but are not limited to, identification information and/or network address information associated with other components of the system 100 and/or any number of external devices or systems, information that may be utilized to identify one or more users (e.g., stored image data, voice samples, etc.), vehicle location information, collected contextual information associated with a vehicle environment, and/or any number of language models that may be utilized to generate textual and/or audio outputs. The user profile information 172 may include a wide variety of user identification information, preferences, and/or parameters associated with one or more users. For example, the user profile information may include, but is not limited to, user identification and/or demographic information (e.g., names, ages, etc.), information associated with user networks (e.g., social networking information, etc.), address book information, user preferences associated with the types of contextual information to be obtained and evaluated, user preferences associated with the selection of points of interest, user preferences associated with the generation and/or modification of a vehicle route, user preferences associated with data and/or statistics to be displayed or otherwise output by a navigation system, user preferences associated with the generation of outputs associated with nearby points of interests, user preferences associated with the generation of outputs based upon user-independent and/or user-dependent data, and/or user preferences associated with the management of a contextual game or gaming scenario.

The OS 173 may be a suitable module or application that facilitates the general operation of a navigation and/or natural language system, as well as the execution of other program modules, such as the natural language modules 174, the navigation modules 175, and/or the contextual information modules 176. The natural language modules 174 may include any number of suitable software modules and/or applications that facilitate the generation of a wide variety of natural language outputs. In operation, a natural language module 174 may be configured to generate outputs that utilize relatively natural and descriptive language. For example, any number of suitable language models and other information may be utilized to generate natural language outputs. In certain embodiments, the generated language may be based at least in part upon contextual and/or environmental information associated with a vehicle. In this regard, relatively higher levels of understanding and/or awareness may be provided to users.

In certain embodiments, a natural language module 174 may be configured to generate natural language outputs associated with vehicle navigation. For example, contextual information associated with a vehicle may be obtained from any number of input devices 125 (e.g., image sensors 155, sensors 160, etc.) via the contextual information modules 176. As another example, contextual information may be obtained from any number of data sources 140 and/or applications 145, 150. A wide variety of different types of contextual information may be obtained or collected as desired in various embodiments of the invention. In certain embodiments, image data associated with an external or exterior environment of the vehicle may be collected, and the image data may be evaluated in order to identify contextual information associated with the vehicle. For example, external objects and/or text may be identified. As desired in various embodiments, other contextual information that may be collected includes, for example, traffic information, crime information, air quality information, accident report information, demographic information, statistical information, etc.

Based at least in part upon the obtained contextual information, the natural language module 174 may generate one or more directions associated with vehicle navigation. For example, desired route information and/or current location information for the vehicle may be obtained from the navigation modules 175 and/or the GPS 135. Directions associated with the desired route may then be generated utilizing at least a portion of the obtained contextual information, such as image and/or sensor data. As desired, these directions may include descriptive information associated with a vehicle's environment. For example, a direction to "turn right directly after the yellow truck parked on your right" may be generated and output. As another example, a direction to "keep to the left, following the red car in front of you" may be generated and output. As yet another example, obtained traffic data may be evaluated to determine that a mapped route will encounter relatively heavy traffic, and the message "The traffic ahead is heavy. Would you like to hear an alternative route?" may be output. A user response may then be received from the one or more microphones 165 and processed in order to determine whether a desired route should be updated.

Additionally, as desired, a wide variety of natural language outputs other than navigation outputs may be generated by a natural language module 174. For example, a location of a vehicle and/or contextual data (e.g., image data associated with an external environment, etc.) may be evaluated in order to identify one or more points of interest near the vehicle. Natural language outputs associated with a point of interest may then be generated and output by the natural language module 174. For example, if the vehicle is in San Francisco, an output of "Did you know that the famous San Francisco skyscraper, the Transamerica Pyramid is just around the corner?" may be generated and output based upon a vehicle location. As another example natural language output, a wide variety of other user-independent information, as well as various user-dependent information (e.g., personal network information, address book information, etc.) may be evaluated in order to generate a natural language output. In certain embodiments, questions may be generated in order to engage a user, and received user responses may be evaluated. As desired in certain embodiments, a suitable game may be managed by a natural language module 174, and generated questions may be tailored or personalized based upon user identities. For example, different questions may be generated for adult players, children, and/or family settings. Additionally, in certain embodiments, a game may be conducted across a plurality of vehicles in communication with the vehicle via the communications interfaces 120. Examples of outputs associated with a game or other form of questioning include, but are not limited to: questions associated with a point of interest (e.g., "What's that landmark?," "What year was it built?," etc.); questions associated with user-dependent information (e.g., "Who of your Facebook friends checked-in here yesterday?," "Which of your friends lives near here?", etc.); questions associated with a vehicle route (e.g., "How long will it take to get there?," etc), questions associated with an external vehicle environment ("What state is the car in the next lane from?", "Who can spot the most green trucks?", etc.). As desired, the operations of one or more displays 168 and/or speech synthesizers 167 in the vehicle may be integrated into a game or other interactive scenario. For example, operations of a dashboard display, headrest display, and/or display projected on a window may be directly or indirectly controlled by a natural language module 174. As another example, information to be displayed may be communicated to any number of user devices, such as mobile devices and/or tablet computers. As yet another example, information to be output may be communicated to a speech synthesizer 167 and/or associated audio system (e.g., a stereo system, etc.) and/or to any number of suitable user devices.

In certain embodiments, a user's current task may also be taken into consideration by a natural language module 174 during the generation and output of natural language outputs. For example, vehicle parameters, and/or sensor data (e.g., image data, etc.) associated with a driver of the vehicle may be evaluated in order to determine a current cognitive task of the driver. Generated messages may then be selectively output based upon the identified cognitive task. For example, a message may be output at a point in time when the driver's task has a relatively low demand time, such as when the vehicle is waiting at a traffic light. In this regard, safety may be enhanced.

The navigation modules 175 may include any number of suitable software modules and/or applications that facilitate the generation of a route for a vehicle. In operation, a navigation module 175 may be configured to receive location information, such as GPS coordinates, from a suitable location component, such as the GPS component 135. Additionally, the navigation module 175 may be configured to generate output information, such as display information, associated with the location of the vehicle, and the location information may be communicated to one or more suitable displays 168 for presentation to a user.

In certain embodiments, the navigation module 175 may additionally be configured to generate or determine a route between the vehicle and a destination. For example, a shortest or fastest route to a destination or selected point of interest may be determined. In certain embodiments, information associated with the route may be output via one or more displays 168, and/or information associated with the route may be provided to the natural language modules 174. Additionally, as desired, the navigation module 175 (and/or a natural language model 174) may also take a wide variety of user preferences into consideration during the generation of a desired route for a vehicle and/or during the output of directions. For example, a user profile may be maintained and/or utilized to identify any number of user parameters and/or preferences associated with identifying a destination and/or generating directions to the destination. As one example, a user may request directions to "a good grocery store," and preferences for the user (e.g., historical destination information, rating parameters, etc.) may be evaluated in order to identify a destination. Directions associated with the destination may then be generated and output based upon a route mapped to the destination.

The contextual information modules 176 may include any number of suitable software modules and/or applications that facilitate the collection and/or evaluation of a wide variety of contextual information. In operation, a contextual information module 176 may be configured to receive information from one or more sources (e.g., the input devices 125, the data sources 140, the vehicle applications 145, the network applications 150, etc.), and the contextual information module 176 may evaluate the received information in order to determine contextual information to be provided to the natural language modules 174 and/or the navigation modules 175. For example, image data may be received from the image sensors 155 and/or various measurements data (e.g., range data, etc.) may be received from the other sensors 160, and the received data may be evaluated in order to identify and/or determine contextual information (e.g., objects, text on signs, etc.) associated with an external environment of the vehicle. As another example, traffic, crime, accident, and/or other information may be obtained from one or more data sources. As another example, vehicle parameters (e.g., speed, direction, etc.) may be obtained from one or more suitable vehicle applications 145. Other methods and/or techniques for obtaining contextual information will be appreciated.

As desired, the natural language modules 174, navigation modules 175 and/or the contextual information modules 176 may be implemented as any number of suitable modules. Alternatively, a single module may perform the combined functions described for the modules. A few examples of the operations of the modules are described in greater detail below with reference to FIGS. 2-6.

With continued reference to FIG. 1, the GPS 135 may be any suitable device configured to determine location based upon interaction with a network of GPS satellites. The GPS 135 may provide location information (e.g., coordinates) and/or information associated with changes in location to the processors 105 and/or to a suitable navigation module 175. In this regard, the location of a vehicle may be evaluated and utilized to map a route, identify directions, and/or to obtain a wide variety of information associated with points of interest.

The data sources 140 may include any number of suitable data sources associated with the vehicle and/or any number of external data sources (e.g., user devices, network servers, cloud-based devices, etc.). Additionally, various data sources 140 may be configured to provide a wide variety of suitable information to the processors, including but not limited to, user profile information, information associated with points of interest (e.g., landmarks, tourist attractions, restaurants, merchants, venues, information associated with a number and/or density of points of interest, etc.), traffic information, future traffic information, crime information (e.g., crime rate information associated with various areas, crime rate information extracted from police reports, crime rate information extracted from civilian Web sites, etc.), accident report information, air quality information, demographic information (e.g., average income information associated with various areas, average home selling prices, etc.), and/or a wide variety of other statistical information.

The vehicle applications 145 may include any suitable applications associated with a vehicle, including but not limited to, an application that monitors various vehicle parameters (e.g., speed, direction, etc.) and/or an application that manages communication with other vehicles. The network or run time applications 150 may include any number of network-based applications that may communicate with the processors 105, such as Web or network-hosted applications and/or applications executed by various user devices (e.g., mobile devices, tablet devices, etc.). Examples of suitable network applications 150 include, but are not limited to, social networking applications, email applications, travel applications, gaming applications, etc. Additionally, in certain embodiments, communication may be established via any number of suitable networks (e.g., a Bluetooth-enabled network, a Wi-Fi network, a wired network, a wireless network, etc.) with any number of user devices, such as mobile devices and/or tablet computers. In this regard, input information may be received from the user devices and/or output information may be provided to the user devices.

With reference to the input devices 125, the image sensors 155 may include any known devices that convert optical images to an electronic signal, such as cameras, charge-coupled devices ("CCDs"), complementary metal oxide semiconductor ("CMOS") sensors, or the like. In certain embodiments, the image sensors 155 may be configured to collect data associated with an external environment of a vehicle. In this regard, data collected by the image sensors 155 may be processed in order to determine or identify a wide variety of suitable contextual information, such as external objects and/or associated textual information and/or alphanumeric characters. Additionally, in certain embodiments, one or more image sensors may be utilized inside of a vehicle in order to identify users and/or to detect various user inputs (e.g., gestures, selection of input elements, etc.). The sensors 160 may include any number of suitable sensors configured to collect data associated with a vehicle environment that may be evaluated in order to determine contextual information. Examples of suitable sensors 160 include, but are not limited to, range finders, infrared sensors, etc. Certain sensors may be configured to collect information associated with an external vehicle environment, and other sensors may be configured to collect internal vehicle information (e.g., user input information, selection of input elements, etc.).

The microphones 165 may include microphones of any known type including, but not limited to, condenser microphones, dynamic microphones, capacitance diaphragm microphones, piezoelectric microphones, optical pickup microphones, and/or various combinations thereof. In operation, a microphone 165 may be configured to collect sound waves and/or pressure waves, and the collected data may be evaluated by a suitable speech recognition engine in order to identify user inputs (e.g., commands, responses to questions, etc.). Additionally, as desired in various embodiments, the input devices 125 may include any number of suitable input elements configured to receive user input, such as buttons, knobs, switches, touch screens, capacitive sensing elements, etc.

With reference to the output devices 130, the speech synthesizer 167 may include any number of suitable components configured to output audio speech inputs. In addition to or as an alternative to a speech synthesizer 167, any number of suitable speakers and/or other audio output devices may be provided. The displays 168 may include any number of suitable display devices, such as a liquid crystal display ("LCD"), a light-emitting diode ("LED") display, an organic light-emitting diode ("OLED") display, a touch screen display, and/or a heads-up display. As desired, displays may be situated at a wide variety of suitable locations within a vehicle, such as a dash, a console, a headrest, etc. Additionally, in certain embodiments, suitable projection devices may be configured to project display information onto one or more surfaces, such as a window of the vehicle.

The system 100 or architecture described above with reference to FIG. 1 is provided by way of example only. As desired, a wide variety of other systems and/or architectures may be utilized to generate and output natural language inputs. These systems and/or architectures may include different components and/or arrangements of components than that illustrated in FIG. 1.

Operational Overview

Figure 2:
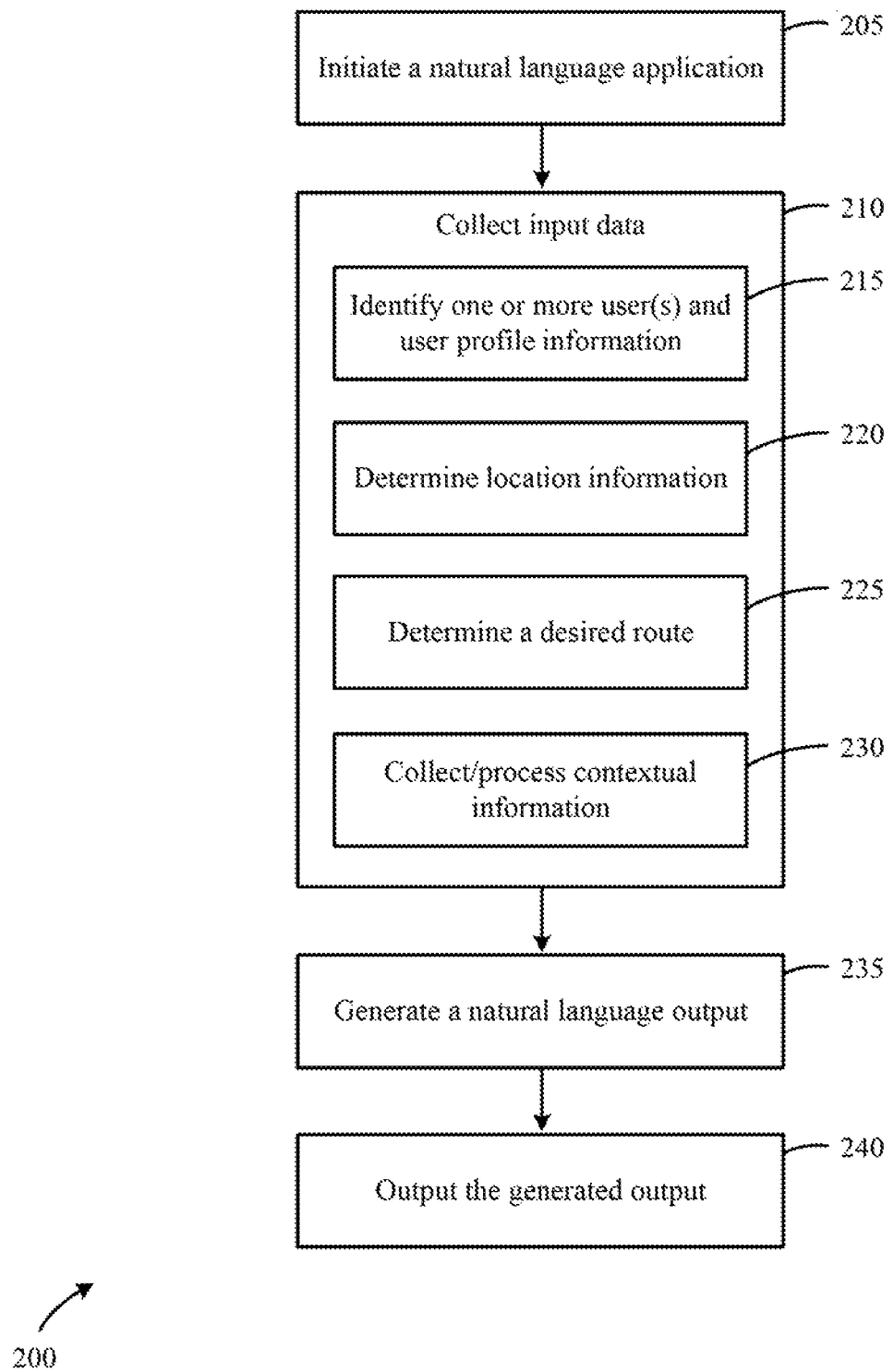
FIG. 2 is a flow diagram of an example method for generating and outputting natural language outputs.

FIG. 2 is a flow diagram of an example method 200 for generating and outputting natural language outputs. In certain embodiments, the operations of the method 200 may be performed by a suitable natural language system and/or one or more associated modules and/or applications, such as the system 100 and/or the associated modules 174, 175, 176 illustrated in FIG. 1. The method 200 may begin at block 205.

At block 205, a natural language module or application may be initiated or executed by one or more processors associated with a vehicle. The natural language application may be configured to generate and direct the output of a wide variety of natural language messages and/or output associated with the vehicle. At block 210, a wide variety of different types of input data may be collected by the natural language application from any number of suitable data sources, user devices, vehicle components, sensors, and/or other applications (e.g., a navigation application, a network application, a vehicle application, etc.). In certain embodiments, one or more users may be identified at block 215, and user profile information associated with the one or more users may be accessed from memory and/or obtained from a suitable data source (e.g., a user device, a cloud-based server, a network server, etc.). A wide variety of suitable methods and/or techniques may be utilized to identify a user. For example, a voice sample of a user may be collected and compared to a stored voice sample. As another example, image data for the user may be collected and evaluated utilizing one or more suitable facial recognition techniques. As another example, other biometric inputs (e.g., fingerprints, etc.) may be evaluated to identify a user. As yet another example, a user may be identified based upon determining a pairing between the vehicle and a user device (e.g., a mobile device, etc.) or a personalized smart key, and/or based upon the receipt and evaluation of user identification information (e.g., a personal identification number, etc.) entered by the user. Once the one or more users have been identified, a wide variety of user profile information may be obtained, such as user identification and/or demographic information (e.g., names, ages, etc.), information associated with user networks (e.g., social networking information, etc.), address book information, user preferences associated with the types of contextual information to be obtained and evaluated, user preferences associated with the selection of points of interest, user preferences associated with the generation and/or modification of a vehicle route, user preferences associated with data and/or statistics to be displayed or otherwise output by a navigation system, user preferences associated with the generation of outputs associated with nearby points of interests, user preferences associated with the generation of outputs based upon user-independent and/or user-dependent data, and/or user preferences associated with the management of a contextual game or gaming scenario.

At block 220, location information associated with the vehicle may be identified. For example, coordinates may be received from a suitable GPS component and evaluated to determine a location of the vehicle. As desired in various embodiments, a wide variety of other vehicle information may be identified, such as a speed, a direction, and/or other suitable parameters. In certain embodiments, the location information may be evaluated in order to identify and/or collect information associated with any number of points of interest (e.g., landmarks, restaurants, merchant locations, etc.). Additionally, in certain embodiments, the location information may be evaluated during the determination of a desired route for the vehicle and/or during the tracking of the vehicle along the desired route.

At block 225, a desired route, such as a desired route for a vehicle, may be determined. In certain embodiments, the route may be a route to an identified destination. Additionally or alternatively, the route may be a route that attempts to avoid undesirable areas (e.g., relatively high traffic areas, relatively high crime areas, etc.) based upon default and/or user preferences. Additionally, in certain embodiments, a destination for the vehicle (e.g., a destination at the end of a desired route) may be determined based upon a wide variety of user preferences and/or parameters. For example, a user may request a type of destination, and user preferences, other user profile information, and/or historical information associated with past destinations may be evaluated to determine a destination and/or to generate directions to the destination. As one example, a user may request directions to "a good grocery store," and preferences for the user (e.g., historical destination information, rating parameters, etc.) may be evaluated and compared to information associated with potential destinations in order to determine a destination. Directions associated with the destination may then be generated and output based upon a route mapped to the destination. In this regard, a user-dependent preference model may be taken into consideration during the generation of directions.

At block 230, a wide variety of contextual information may be collected and/or processed. In certain embodiments, image data associated with an external or exterior environment of the vehicle may be collected, and the image data may be evaluated in order to identify contextual information associated with the vehicle. For example, external objects (e.g., other vehicles, etc.) and/or text (e.g., traffic signs, billboards, etc.) may be identified. Additionally, as desired, distances between the vehicle and the external objects may be determined utilizing any number of suitable sensors (e.g., range finders, etc.). Other contextual information, for example, traffic information, crime information, air quality information, accident report information, demographic information, statistical information, etc., may be obtained from any number of suitable data sources, such as network-based and/or cloud-based data sources. Other types of contextual information may be obtained from any number of suitable vehicle and/or network applications. In certain embodiments, a vehicle location may also be identified and/or tracked as contextual information. Additionally, in certain embodiments, communication may be established with any number of user devices (e.g., tablet computers, mobile devices, etc.) and/or other vehicles, and a wide variety of information (e.g., user profile information, identifications for game participants, contextual information collected from data sources, etc.) may be obtained from the user devices and/or other vehicles.

At block 235, at least one natural language output may be generated, and the generated natural language output may be output at block 240 for presentation to one or more users. A wide variety of different types of natural language outputs may be generated as desired in various embodiments. For example, one or more natural language directions associated with vehicle navigation may be generated based at least in part upon a desired destination, a determined route, and/or contextual information associated with a vehicle's environment. As desired, these directions may include descriptive information associated with a vehicle's environment. For example, a direction to "turn right directly after the yellow truck parked on your right" may be generated and output. As another example, a direction to "keep to the left, following the red car in front of you" may be generated and output. As yet another example, obtained traffic data may be evaluated to determine that a mapped route will encounter relatively heavy traffic, and the message "The traffic ahead is heavy. Would you like to hear an alternative route?" may be output. A user response may then be received and processed.

Additionally, as desired, a wide variety of natural language outputs other than navigation outputs may be generated and output. For example, a location of a vehicle and/or contextual data (e.g., image data associated with an external environment, etc.) may be evaluated in order to identify one or more points of interest near the vehicle. Natural language outputs associated with a point of interest (e.g., identification information for a point of interest, fun facts associated with the point of interest, questions regarding the point of interest, etc.) may then be generated and output. As another example natural language output, a wide variety of other user-independent information, as well as various user-dependent information (e.g., personal network information, address book information, etc.) may be evaluated in order to generate a natural language output. In certain embodiments, questions may be generated in order to engage a user or group of users, and received user responses may be evaluated. As desired in certain embodiments, a suitable game may be managed, and generated questions may be tailored or personalized based upon user identities. Additionally, in certain embodiments, a game may be conducted across a plurality of vehicles in communication with the vehicle.

The method 200 may end following block 240.

Figure 3:
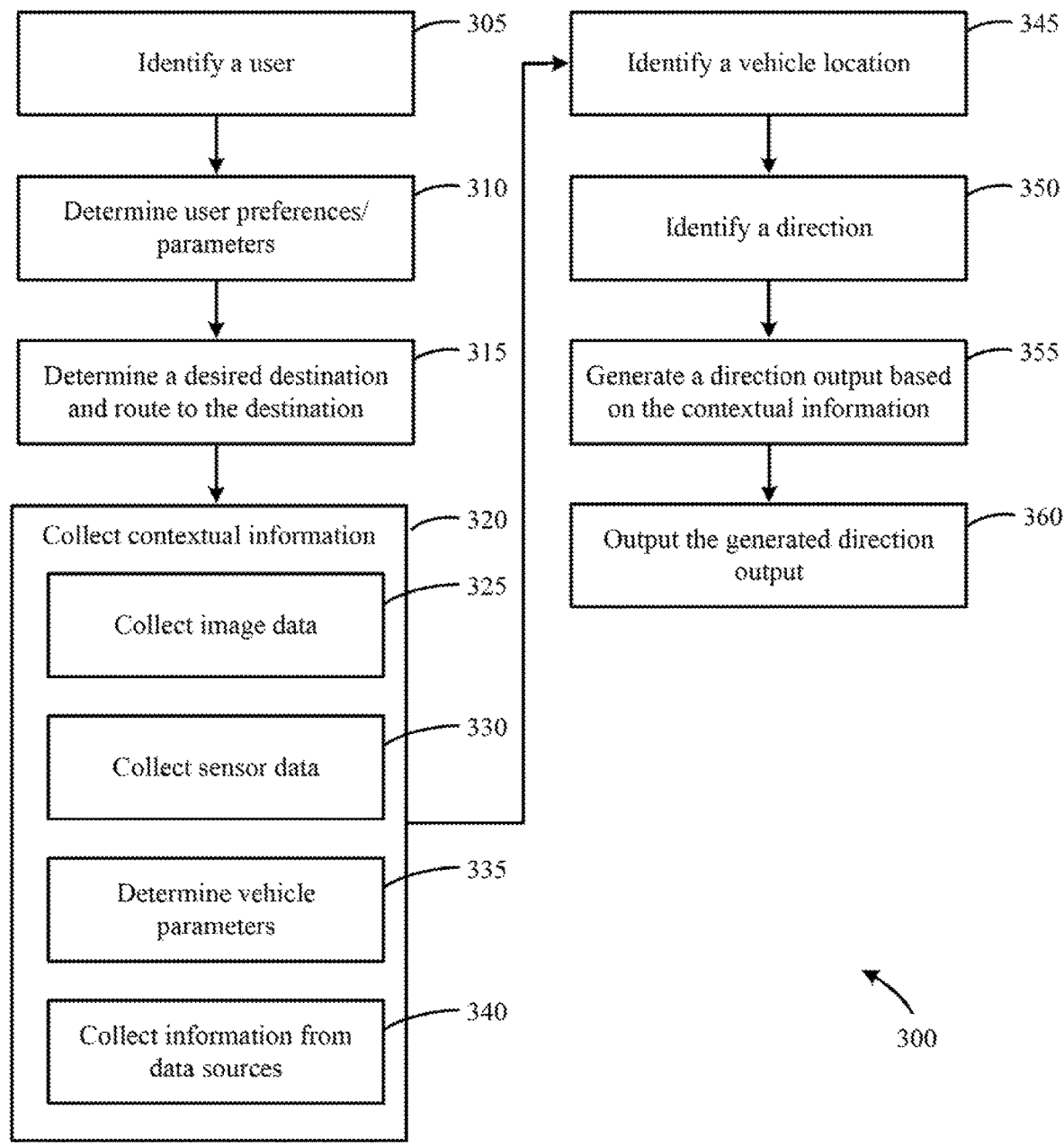
FIG. 3 is a flow diagram of an example method for generating and outputting natural language outputs associated with navigation directions.

FIG. 3 is a flow diagram of an example method 300 for generating and outputting natural language outputs associated with navigation directions. The natural language outputs generated by the method 300 are one example of the outputs that may be generated by the method 200 of FIG. 2. Accordingly, the operations of the method 300 may be performed by a suitable natural language system and/or one or more associated modules and/or applications, such as the system 100 and/or the associated modules 174, 175, 176 illustrated in FIG. 1. The method 300 may begin at block 305.

At block 305, a user associated with a vehicle may be identified. For example, a driver of the vehicle may be identified based upon a wide variety of suitable techniques and/or combinations of techniques. Examples of suitable identification techniques include, but are not limited to, voice identification, facial recognition identification, other biometric identification, identification of a pairing between the vehicle and a user device (e.g., a mobile device, etc.) or a personalized smart key, and/or evaluation of user identification information (e.g., a personal identification number, etc.) entered by the user. Once the user has been identified, a wide variety of user preferences and/or parameters may be determined (e.g., accessed from a user profile, etc.) and/or obtained (collected from a user device, collected from a network-based server, etc.) at block 310. For example, user preferences and/or parameters associated with the generation and/or modification of a vehicle route (e.g., traffic avoidance preferences, preferences associated with toll roads, preferences associated with types of roads, etc.), the determination of a desired destination, and/or data and/or statistics to be displayed or otherwise output by a navigation system may be determined or identified.

At block 315, a desired destination and/or route to the desired destination may be determined. In certain embodiments, the route may be a route to a destination identified or selected by a user. In other embodiments, a destination may be determined based upon user preferences and, as desired, the destination may be approved by a user. For example, a user may request a type of destination (e.g., "a good grocery store," "a five star seafood restaurant," etc.), and user preferences, other user profile information, and/or historical information associated with past destinations may be evaluated to determine a destination and/or to generate directions to the destination. Additionally, a wide variety of user preferences may be taken into consideration during the generation of a route to a destination. For example, a determined route may attempt to avoid undesirable areas (e.g., relatively high traffic areas, relatively high crime areas, etc.) based upon user preferences.

At block 320, a wide variety of contextual information associated with the vehicle may be identified, obtained, and/or determined. For example, at block 325, image data associated with an external vehicle environment may be collected from one or more suitable image sensors (e.g., one or more external cameras, etc.). The image data may be evaluated via any number of suitable image evaluation techniques in order to identify one or more objects associated with the external environment, as well as any number of characteristics associated with the objects (e.g., object classifications, object types, colors, etc.). Image data may also be evaluated in order to identify alphanumeric and/or textual data, such as data included on signs, etc. As another example, at block 330, a wide variety of sensor data and/or measurements data may be collected from any number of suitable sensors, such as range finders, infrared sensors, etc. As desired, the collected sensor data may be evaluated for a wide variety of purposes, for example, to determine respective distances between the vehicle and one or more identified objects (e.g., other vehicles, buildings, signs, trees, etc.). In certain embodiments, the identified environmental information may be utilized during the generation of natural language directions. For example, a driver may be instructed to turn right after an identified parked vehicle.

As another example of collecting contextual information, at block 335, information associated with one or more suitable vehicle parameters, such as a speed, a direction, an amount of remaining fuel, etc., may be collected and/or determined. For example, vehicle parameter data may be read from a suitable vehicle data bus (e.g., a CANBUS) and/or received from any number of suitable vehicle applications. In certain embodiments, at least a portion of the vehicle parameters may be taken into consideration during the tracking of a route and/or during the generation of directions. As one example, a speed of the vehicle (e.g., a current speed, a cruise control speed, etc.) may be considered in conjunction with a current location and distance to a destination to generate a temporal direction, such as "Exit at Exit A in approximately 10 minutes."

As yet another example of collecting contextual information, at block 340, a wide variety of information may be collected from any number of suitable data sources, such as network data servers, cloud-based servers, user devices, and/or other vehicles. Examples of information that may be obtained include, but are not limited to, traffic information, future traffic information, crime information (e.g., crime rate information associated with various areas, crime rate information extracted from police reports, crime rate information extracted from civilian Web sites, etc.), accident report information, air quality information, demographic information (e.g., average income information associated with various areas, average home selling prices, etc.), and/or a wide variety of other statistical information. In certain embodiments, at least a portion of the information may be utilized to generate natural language inputs. For example, traffic data may be evaluated, and an output of "Traffic is heavy ahead. Would you like to take an alternate route?" may be generated. Additionally, as desired, one or more displays associated with a navigation system may be controlled based at least in part upon the collected information. For example, crime awareness information (e.g., color coding, etc.), accident information (e.g., accident icons, etc.), and/or traffic information may be output for presentation via one or more suitable displays.

At block 345, a location of the vehicle may be identified or determined. For example, GPS coordinates may be received from a GPS device or component, and a location may be determined from the GPS coordinates. At block 350, a direction of the vehicle may be determined, for example, from evaluating changes in location information and/or from evaluating suitable compass information. As desired, the location and/or direction information may be evaluated in conjunction with a desired destination and/or a determined route. In this regard, one or more driving directions may be identified in order to facilitate travel to the destination via the route.

At block 355, at least one direction output may be generated based at least in part upon the contextual information, and the generated direction may be output for presentation (e.g., audio presentation, visual presentation, etc.) to a user at block 360. As desired, a generated direction may include descriptive information associated with a vehicle's environment. For example, a direction to "turn right directly after the yellow truck parked on your right" may be generated and output. As another example, a direction to "keep to the left, following the red car in front of you" may be generated and output. Other example directions will be appreciated.

The method 300 may end following block 360.

Figure 4:
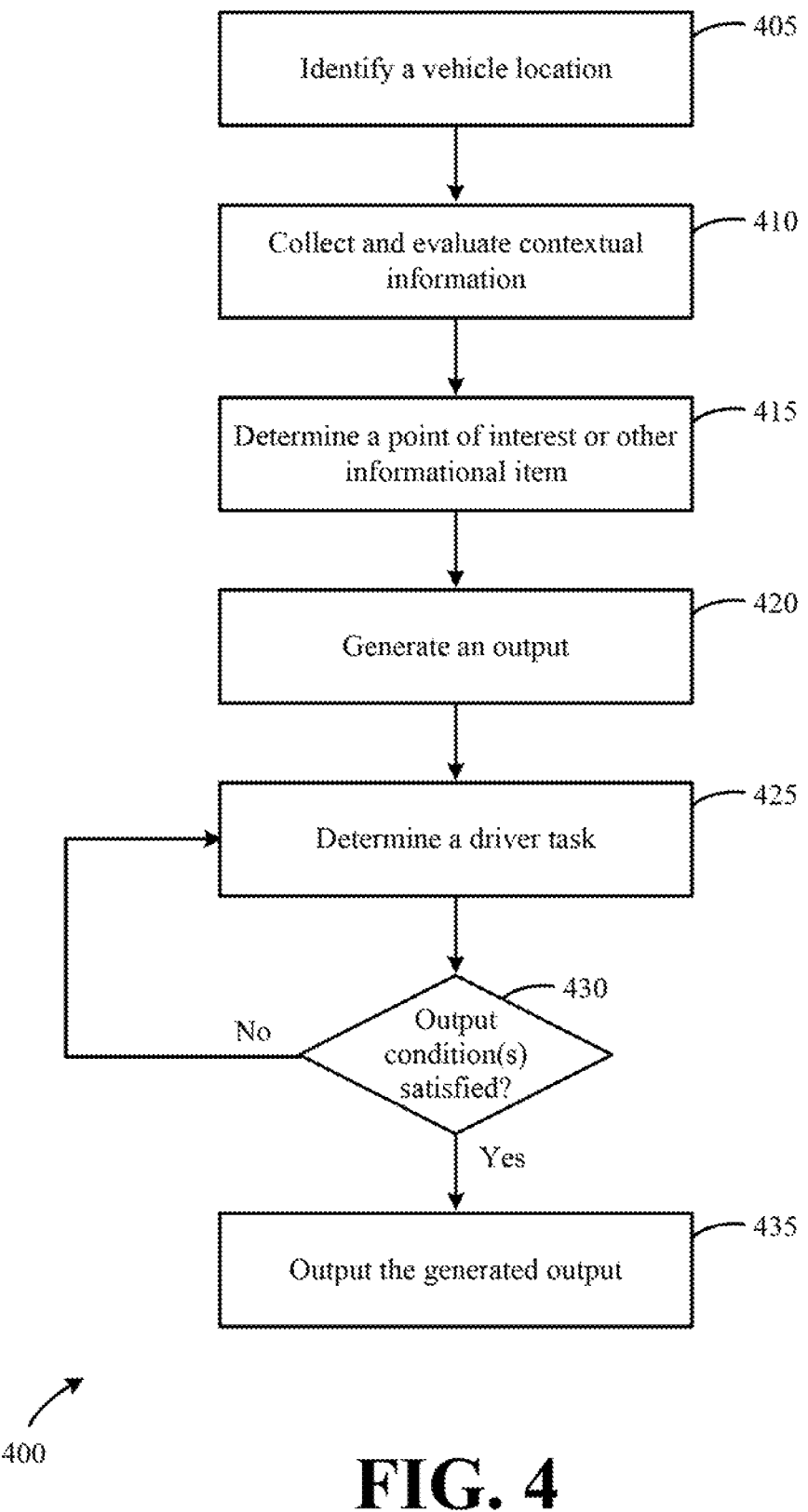
FIG. 4 is a flow diagram of an example method for generating and outputting natural language outputs associated with informational items.

FIG. 4 is a flow diagram of an example method 400 for generating and outputting natural language outputs associated with informational items. The natural language outputs generated by the method 400 are one example of the outputs that may be generated by the method 200 of FIG. 2. Accordingly, the operations of the method 400 may be performed by a suitable natural language system and/or one or more associated modules and/or applications, such as the system 100 and/or the associated modules 174, 175, 176 illustrated in FIG. 1. The method 400 may begin at block 405.

At block 405, a location of the vehicle may be identified or determined. For example, GPS coordinates may be received from a GPS device or component, and a location may be determined from the GPS coordinates. At block 410, a wide variety of contextual information associated with the vehicle may be collected and evaluated. For example, based upon the determined vehicle location, contextual information associated with nearby points of interest (e.g., landmarks, restaurants, merchants, museums, etc.) may be collected from one or more suitable data sources. As desired, one or more suitable user parameters may be evaluated during the collection of information associated with points of interest. For example, user parameters may specify the types of locations that a user would like to have identified. As another example, user identification information (e.g., age, gender, etc.) and/or historical information may be evaluated in order to identify relevant points of interest. As yet another example, user information may identify a "home area" of the user, and a determination may be made to identify certain points of interest (e.g., tourist attractions, etc.) in the event that the vehicle travels outside of the "home area." As another example of collecting contextual information, a wide variety of user-independent information (e.g., historical information, factual information, advertisement information, etc.) and/or user-dependent information (e.g., information associated with contacts of a user, social media information, etc.) may be collected and evaluated.

At block 415, a point of interest or other suitable informational item may be identified based at least in part upon the vehicle location and/or other contextual information. An output (e.g., audio output, visual output, etc.) associated with the identified point of interest or information item may then be generated at block 420. For example, if the vehicle is in San Francisco, an output of "Did you know that the famous San Francisco skyscraper, the Transamerica Pyramid, is just around the corner?" may be generated. As another example, an output of "Look at the art museum on the right" may be generated. As a result of including information associated with a current situation of a user and/or a vehicle, generated outputs may make it relatively easy for a user to engage and to understand information. Other example outputs associated with user-independent and/or user-dependent information include, but are not limited to, "Two of your Facebook friends checked-in here yesterday?," "Your friend John works near here," "The coffee shop on the right has a coupon available for download," etc. Indeed, a wide variety of suitable outputs may be generated as desired.

In certain embodiments, a user's current task may also be taken into consideration during the generation and output of natural language outputs. For example, at block 425, a cognitive task of a driver (e.g., driving in traffic, driving with the cruise control on, stopped at a traffic light, etc.) may be determined based upon a wide variety of vehicle parameters (e.g., speed, etc.), internal image and/or sensor data (e.g., image data of a driver, steering wheel, etc.) associated with a driver, and/or external image and/or sensor data associated with the vehicle. At block 430, a determination may be made as to whether one or more output conditions associated with the generated output have been satisfied. For example, a determination may be made as to whether an identified cognitive task of the driver includes a cognitive demand lower than a threshold value associated with the output of a message. If it is determined at block 430 that at least one output condition has not been satisfied, then operations may continue at block 425, and the driver task may continue to be monitored. Additionally, in the event that a generated output is no longer relevant (e.g., a location has changed, etc.), then the generated output may be disregarded. If, however, it is determined at block 430 that the one or more output conditions have been satisfied, then operations may continue at block 435, and the generated output or message may be output for presentation to a user. In this regard, generated messages may then be selectively output based upon the identified cognitive task, and safety may be enhanced and/or minimally compromised.

The method 400 may end following block 435.

Figure 5:
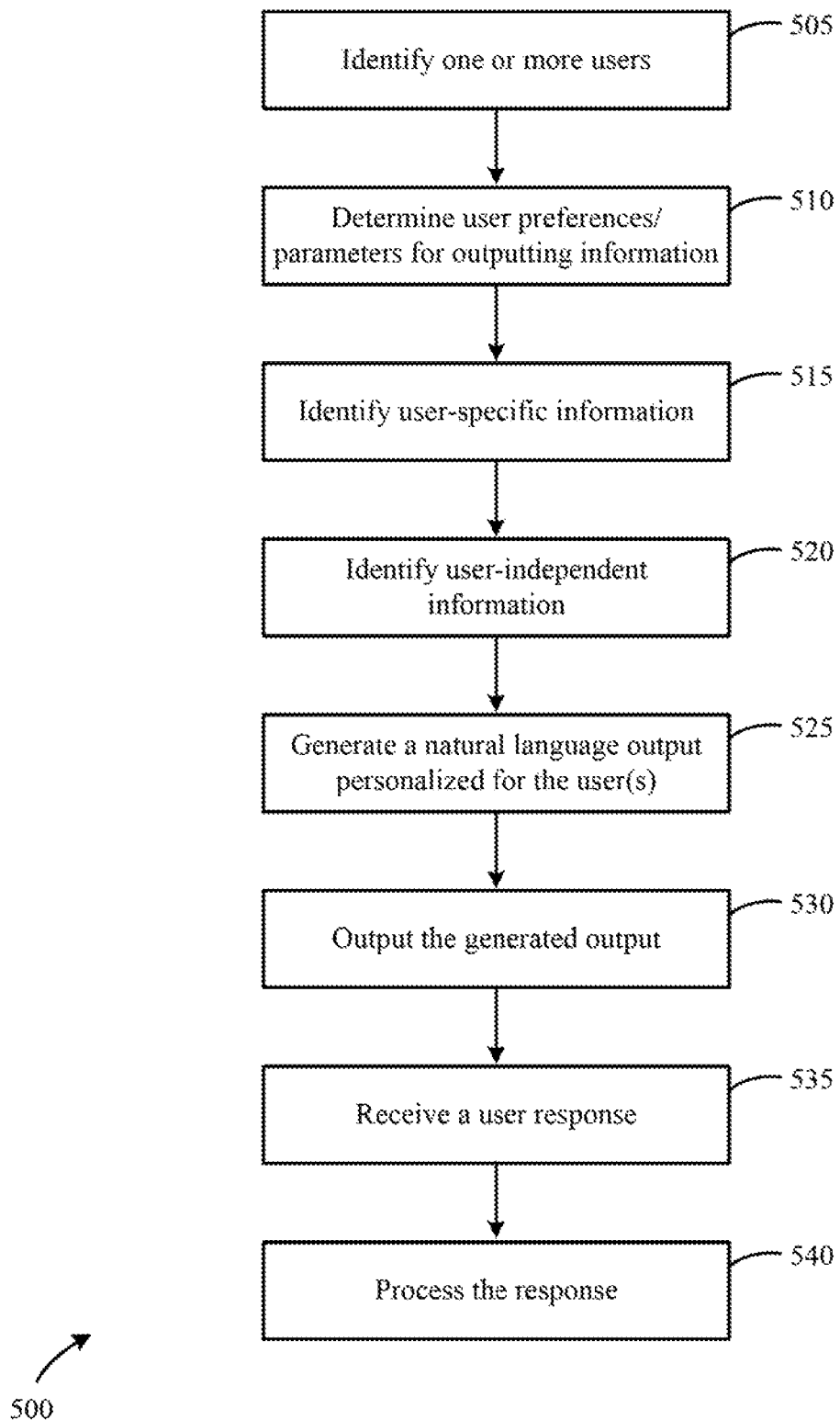
FIG. 5 is a flow diagram of an example method for providing interactive outputs to one or more users.

FIG. 5 is a flow diagram of an example method 500 for providing interactive outputs to one or more users. The natural language outputs generated by the method 500 are one example of the outputs that may be generated by the method 200 of FIG. 2. Accordingly, the operations of the method 500 may be performed by a suitable natural language system and/or one or more associated modules and/or applications, such as the system 100 and/or the associated modules 174, 175, 176 illustrated in FIG. 1. The method 500 may begin at block 505.

At block 505, one or more users (e.g., a driver, one or more passengers) associated with a vehicle may be identified. For example, various users may be identified based upon any number of suitable identification techniques, such as voice identification, facial recognition identification, other biometric identification, identification of a pairing between the vehicle and a user device (e.g., a mobile device, etc.) or a personalized smart key, and/or evaluation of user identification information (e.g., a personal identification number, etc.) entered by the user. Once the one or more users have been identified, a wide variety of user preferences and/or parameters may be determined (e.g., accessed from a user profile, etc.) and/or obtained (collected from a user device, collected from a network-based server, etc.) at block 510. For example, personal user information (e.g., ages, genders, etc.) and/or preferences associated with the generation of interactive outputs may be accessed and/or otherwise obtained.

Additionally, as desired in various embodiments, one or more current emotional states or feelings of a user may be identified (or approximated) and taken into consideration during a determination of whether outputs (e.g., interactive outputs, informational outputs, etc.) should be generated. For example, sensor data (e.g., image data, speech signal etc.) associated with the driver of the vehicle and/or various passengers may be evaluated in order to determine current "emotions" and/or "feelings" associated with the users (e.g., stress, anger, boredom, excitement). Based at least in part upon the identified or determined emotions, a determination may be made as to whether the users will be automatically engaged and/or generated messages may be selectively output based upon the identified feelings. Additionally, generated messages may be tailored based upon the identified emotions or emotional state. Although the evaluation of an emotional state is described above in conjunction with providing interactive outputs, an emotional state may also be evaluated in order to determine whether other types of outputs should be generated and output.

At block 515, a wide variety of user-specific or user-dependent information may be identified, determined, and/or obtained from any number of sources. For example, information associated with one or more personal networks (e.g., social media, etc.), user address book and/or contact information, and/or other user information may be obtained. Similarly, at block 520, a wide variety of user-independent information, such as point of interest information, factual information, historical information, etc., may be obtained.

At block 525, at least one natural language output may be generated based at least in part upon the user identities, user-specific information, user-independent information, and/or user preferences. The at least one generated output may then be output for presentation to the one or more users at block 530. In certain embodiments, a natural language output may be personalized or customized for one or more users. For example, if two adults are identified as being present in a vehicle, then an output appropriate for adults may be generated. As another example, if a child is identified as being present, then an output appropriate for a child (e.g., an output based upon a comprehension level of the child) may be generated.

Additionally, in certain embodiments, a generated output may be in the form of a question. In this regard, an interactive process may be facilitated in which user responses are solicited and processed. As desired, one or more questions may be incorporated into a suitable game (e.g., a trivia game, etc.). Examples of outputs associated with a game or other form of questioning include "What's that landmark?," "What year was it built?," "Who of your Facebook friends checked-in here yesterday?," "How long will it take to get there?," etc. As desired, the operations of one or more displays and/or audio output devices in the vehicle may be integrated into a game or other interactive scenario.

In the event that a generated output is in the form of a question, a user response to the question may be received at block 535 and processed at block 540. For example, a voice response may be received via one or more microphones and evaluated utilizing a speech recognition module. As other examples, responses may be selected via a touch screen display, any number of user input elements (e.g., buttons, knobs, etc.), and/or received from one or more user devices (e.g., tablet computers, mobile devices, etc.). Based upon a processing or evaluation of a received response, an indication (e.g., visual indication, audio indication, message to be communicated to a user device, etc.) associated with whether or not the response is correct may be generated and output. As desired, one or more follow-up questions and/or items of additional information may also be generated and output. Additionally, in a gaming scenario, any number of game parameters (e.g., score, board game positions, etc.) may be updated. As desired, a wide variety of suitable output devices, including vehicle displays and/or displays overlaid on or projected onto a window or other surface, may be updated in accordance with the gaming scenario.

The method 500 may end following block 540.

Figure 6:
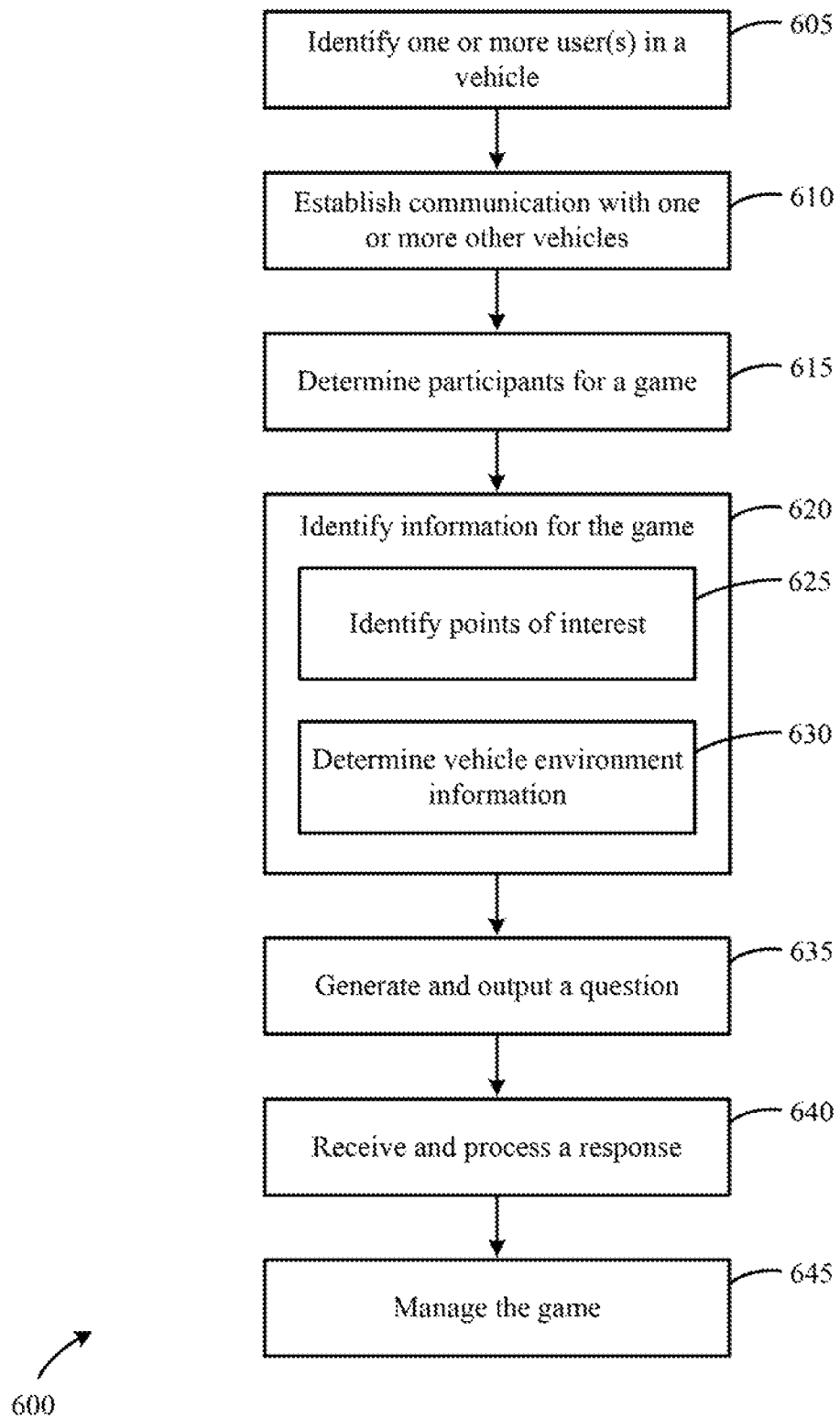
FIG. 6 is a flow diagram of an example method for managing an interactive game between a plurality of vehicles.

FIG. 6 is a flow diagram of an example method 600 for managing an interactive game between a plurality of vehicles. The natural language outputs generated by the method 600 are one example of the outputs that may be generated by the method 200 of FIG. 2. Accordingly, the operations of the method 600 may be performed by a suitable natural language system and/or one or more associated modules and/or applications, such as the system 100 and/or the associated modules 174, 175, 176 illustrated in FIG. 1. The method 600 may begin at block 605.

At block 605, one or more users within a vehicle may be identified and, as desired, one or more users desiring to participate in a game may be identified. At block 610, one or more other vehicles containing participants for the game or gaming scenario (e.g., a trivia game, etc.) may be identified. As desired, a vehicle may communicate with one or more nearby vehicles via any number of suitable networks and/or other communication techniques (e.g., signals output via taillights, etc.). For example, one or more networks may facilitate the establishment of communication with other vehicles. In this regard, participants for a game (e.g., identification of users or players, etc.) included in the vehicle and one or more other vehicles may be determined at block 615. In certain embodiments, a vehicle display (e.g., window display, etc.) may output, towards an exterior of the vehicle for receipt by another vehicle (e.g., detection via a camera or other image sensor, etc.), information associated with a game, such as an advertisement for a willingness to play, information associated with users, information associated with answers to questions, a current score, and/or a final result. In other embodiments, at least a portion of the game information may be communicated via one or more suitable networks.

At block 620, a wide variety of information associated with a game may be identified or determined, such as contextual information, historical information, and/or trivia information. For example, at block 625, information associated with points of interest may be obtained based upon the locations of one or more of the vehicles. As another example, at block 630, information associated with the vehicular environment may be determined based upon a wide variety of image data. Other types of game information may also be obtained as desired.

At block 635, a question associated with the game may be generated from the identified information, and the generated question may be output. For example, a vehicle that generates the question may output the question to users in the vehicle. As another example, the vehicle may communicate the question to one or more other vehicles for output. At block 640, any number of responses to the question may be received (e.g., received via input devices, received from other vehicles, etc.) and processed. For example, a determination may be made as to whether the responses are correct. As desired, any number of questions associated with a game may be generated, and any number of responses may be evaluated. Additionally, at block 645, a wide variety of operations may be performed in order to facilitate the management of the game. For example, a score may be maintained, and a final outcome of the game may be determined. Indeed, a wide variety of gaming operations will be readily apparent.

The method 600 may end following block 645.

The operations described and shown in the methods 200, 300, 400, 500, 600 of FIGS. 2-6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-6 may be performed.

Certain embodiments of the disclosure described herein may have the technical effect of generating natural language outputs associated with a vehicular environment. For example, navigation directions may be generated and/or output based upon a desired route and contextual information associated with the vehicle, such as information associated with an external environment of the vehicle. As a result, descriptive information associated with a vehicle's environment may be included in generated directions, thereby enhancing the user experience.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle electronic system, comprising:
   at least one processor;
   memory circuitry;

an input/output (I/O) interface to couple to the at least one processor to one or more output devices;
a communications interface to transmit information to and receive information from a mobile device; and
at least one computer-readable storage device having instructions stored thereon that, when executed by the at least one processor, result in operations comprising:
identify a user of the mobile device;
cause an autonomous transfer of user information and information associated with each of a plurality of potential destinations associated with the identified user between the vehicle electronic system and the user's mobile device, wherein the user information includes:
user preference information obtained from the user's mobile device; and
address information associated with each of the plurality of potential destinations obtained from the user's mobile device;
cause an autonomous selection of a preferred destination from the plurality of potential destinations received from the mobile device using at least a portion of the user preference information included in the received user information;
cause a determination of data corresponding to a route to the autonomously determined preferred destination and route preference information associated with the user retrieved by the at least one processor from the memory circuitry; and
cause a communication of the data corresponding to the route to the autonomously determined preferred destination to the one or more output devices.

2. The vehicle electronic system of claim 1 wherein the instructions, when executed by the at least one processor, result in operations comprising:
cause communication of the address information from the user's mobile device to the vehicle electronic system.

3. The vehicle electronic system of claim 1 wherein the instructions, when executed by the at least one processor, result in operations comprising:
receive a request from the user specifying a type of destination;
wherein to cause the autonomous determination of the preferred destination for the user based on the received user information includes to cause the autonomous determination of a destination having the specified type.

4. The vehicle electronic system of claim 1 further comprising:
a second input/output (I/O) interface to couple the at least one processor to at least one microphone; and
a third I/O interface to couple the at least one processor to at least one speaker.

5. The vehicle electronic system of claim 1 wherein the instructions, when executed by the at least one processor, result in operations comprising:
cause the data corresponding to the route to the destination to be displayed on the one or more output devices, the one or more output devices including at least one display device.

6. The vehicle navigation method of claim 1 wherein the instructions, when executed by the at least one processor, result in operations comprising:
cause a determination of a current location of a vehicle;
wherein the instructions that result in the operation to cause a determination of the data corresponding to the route to the destination result in operations that include:
cause a determination of data corresponding to a route from the current location of the vehicle to the destination.

7. A vehicle navigation method, comprising:
identifying a user of a mobile device;
receiving, by at least one vehicle electronic system processor via a communication interface, an autonomous transfer of user information from the mobile device, wherein the received user information includes:
user preference information obtained from the user's mobile device; and
address information associated with each of a plurality of potential destinations obtained from the user's mobile device;
autonomously selecting, by the at least one vehicle electronic system processor and based on the received user information, a preferred destination from the plurality of potential destinations received from the mobile device using at least a portion of the user preference information included in the received user information;
determining, by the at least one vehicle electronic system processor, data corresponding to a route to the autonomously determined preferred destination and route preference information associated with the user; and
communicating, by the at least one vehicle electronic system processor via a second I/O interface, the data corresponding to the route to the autonomously determined preferred destination to one or more output devices.

8. The vehicle navigation method of claim 7 wherein communicating the data corresponding to the route to the destination to one or more output devices comprises:
causing, by the at least one vehicle electronic system processor, a video display device to display the data corresponding to the route to the destination to one or more occupants of the vehicle.

9. The vehicle navigation method of claim 7 further comprising receiving, by the at least one vehicle electronic system processor, a request from the user specifying a type of destination, and wherein autonomously determining the preferred destination based on the user information includes autonomously determining a destination having the specified type.

10. The vehicle navigation method of claim 7, comprising:
causing, by the at least one vehicle electronic system processor, a determination of a current location of a vehicle;
wherein determining the data corresponding to the route to the destination includes determining data corresponding to a route from the current location of the vehicle to the destination.

11. A vehicle navigation system, comprising:
means for receiving a communication from a user's mobile device, the communication including user information that includes address information;
means for autonomously determining a destination based on the user information from the user's mobile device;
means for determining data corresponding to a route to the destination; and
means for communicating the data corresponding to the route to the destination to one or more output devices.

12. The vehicle navigation system of claim 11 wherein the means for communicating the data corresponding to the route to the destination to one or more output devices comprises:
  means for causing a video display device to display the data corresponding to the route to the destination to one or more occupants of the vehicle.

13. The vehicle navigation system of claim 11 further comprising means for receiving a request from the user specifying a type of destination, and wherein autonomously determining the destination based on the user information includes autonomously determining a destination having the specified type.

14. The vehicle navigation system of claim 11, comprising:
  means for causing a determination of a current location of a vehicle;
    wherein the means for determining the data corresponding to the route to the destination includes:
      means for determining data corresponding to a route from the current location of the vehicle to the destination.

15. A non-transitory machine-readable storage medium that includes instructions that, when executed by a processor, result in operations comprising:
  identify a user of a mobile device;
  receive an autonomous transfer of user information from the mobile device, wherein the received user information includes:
  user preference information obtained from the user's mobile device; and
  address information associated with each of a plurality of potential destinations associated with the identified user and obtained from the user's mobile device;
  autonomously select a preferred destination from the plurality of potential destinations received from the mobile device using at least a portion of the user preference information included in the received user information;
  determine data corresponding to a route to the autonomously determined preferred destination and route preference information associated with the user; and
  communicate the data corresponding to the route to the autonomously determined preferred destination to one or more output devices.

16. The non-transitory machine-readable storage medium of claim 15 wherein the instructions, when executed by the at least one processor, result in operations that include:
  cause a visual display device to display the data corresponding to the route to the destination to one or more occupants of the vehicle.

17. The non-transitory machine-readable storage medium of claim 15 wherein the instructions, when executed by the at least one processor, result in operations that include:
  receive a request from the user specifying a type of destination;
  wherein to autonomously determine a destination based on the received user information includes to autonomously determine a destination having the specified type.

18. The non-transitory machine-readable storage medium of claim 15 wherein the instructions, when executed by the at least one processor, result in operations that include:
  cause a determination of a current location of a vehicle; and
  determine data corresponding to a route from the current location of the vehicle to the destination.

19. A vehicle, comprising:
  one or more sensors;
  a global positioning system;
  at least one microphone;
  at least one speaker;
  one or more output devices; and
  a vehicle electronic system coupled to the one or more, the global positioning system, and the at least one output device, the vehicle electronic system including:
    at least one processor;
    memory circuitry;
    a first input/output (I/O) interface to couple to the at least one processor and to receive voice data from the at least one microphone;
    a second I/O interface to couple to the at least one processor and to the one or more output devices;
    a third I/O interface to couple to the at least one processor and to provide sound data from the at least one speaker;
    a communications interface to transmit information to and receive information from a user's mobile device; and
    at least one computer-readable storage device having instructions stored thereon that, when executed by the at least one processor, result in operations comprising:
      identify a user of a mobile device;
      cause an autonomous transfer, via the communications interface, of user information and information associated with each of a plurality of potential destinations associated with the identified user between the vehicle electronic system and the user's mobile device, wherein the user information includes:
      user preference information obtained from the user's mobile device; and
      address information associated with each of the plurality of potential destinations obtained from the user's mobile device;
      cause an autonomous selection of a preferred destination from the plurality of potential destinations received from the mobile device using at least a portion of the user preference information included in the received user information;
      cause a determination of data corresponding to a route to the autonomously determined preferred destination and route preference information associated with the user retrieved by the at least one processor from the memory circuitry; and
      cause a communication of the data corresponding to the route to the autonomously determined preferred destination to the one or more output devices.

20. The vehicle of claim 19 wherein the instructions, when executed by the at least one processor, result in operations comprising:
  cause communication of the address information from the user's mobile device to the vehicle electronic system.

21. The vehicle of claim 19 wherein the instructions, when executed by the at least one processor, result in operations comprising:
  receive a request from the user specifying a type of destination;
  wherein to cause the autonomous determination of the preferred destination for the user based on the received user information includes to cause the autonomous determination of a destination having the specified type.

22. The vehicle of claim 19 wherein the instructions, when executed by the at least one processor, result in operations comprising:
cause the data corresponding to the route to the destination to be displayed on the one or more output devices, the one or more output devices including at least one display device.

23. The vehicle of claim 19 wherein the instructions, when executed by the at least one processor, result in operations comprising:
cause a determination of a current location of the vehicle;
wherein the instructions that result in the operation to cause a determination of the data corresponding to the route to the destination result in operations that include:
cause a determination of data corresponding to a route from the current location of the vehicle to the destination.

24. The vehicle of claim 19 wherein the instructions, when executed by the at least one processor, further result in operations that include to receive a request from the user specifying a destination identifier that does not include a physical destination address, and wherein to cause the autonomous determination of the preferred destination based on the user information includes to cause autonomous determination of a physical destination address associated with the specified destination identifier.

25. The vehicle of claim 19 wherein the communicated user information further includes preference information associated with the user, the preference information including one or more of a group that includes historical destination information, destination rating information, and/or one or more destination rating parameters.

26. The vehicle electronic system of claim 1 wherein the instructions, when executed by the at least one processor, further result in operations that include to receive a request from the user specifying a destination identifier that does not include a physical destination address, and wherein to cause the autonomous determination of the preferred destination based on the user information includes to cause autonomous determination of a physical destination address associated with the specified destination identifier.

27. The vehicle electronic system of claim 1, wherein the communicated user information further includes preference information associated with the user, the preference information including one or more of a group that includes historical destination information, destination rating information, and/or one or more destination rating parameters.

28. The vehicle navigation method of claim 7, further comprising receiving, by the at least one vehicle electronic system processor, a request from the user specifying a destination identifier that does not include a physical destination address, and wherein autonomously determining the preferred destination based on the user information includes autonomously determining a physical destination address associated with the specified destination identifier.

29. The vehicle navigation method of claim 7, wherein the received user information further includes preference information associated with the user, the preference information including one or more of a group that includes historical destination information, destination rating information, and/or one or more destination rating parameters.

30. The non-transitory machine-readable storage medium of claim 15, wherein the instructions further result in operations comprising receiving, by the at least one vehicle electronic system processor, a request from the user specifying a destination identifier that does not include a physical destination address, and wherein to autonomously determine the destination based on the user information includes to autonomously determine a physical destination address associated with the specified destination identifier.

31. The non-transitory machine-readable storage medium of claim 15, wherein the received user information further includes preference information associated with the user, the preference information including one or more of a group that includes historical destination information, destination rating information, and/or one or more destination rating parameters.

* * * * *